United States Patent Office 3,500,241
Patented Mar. 10, 1970

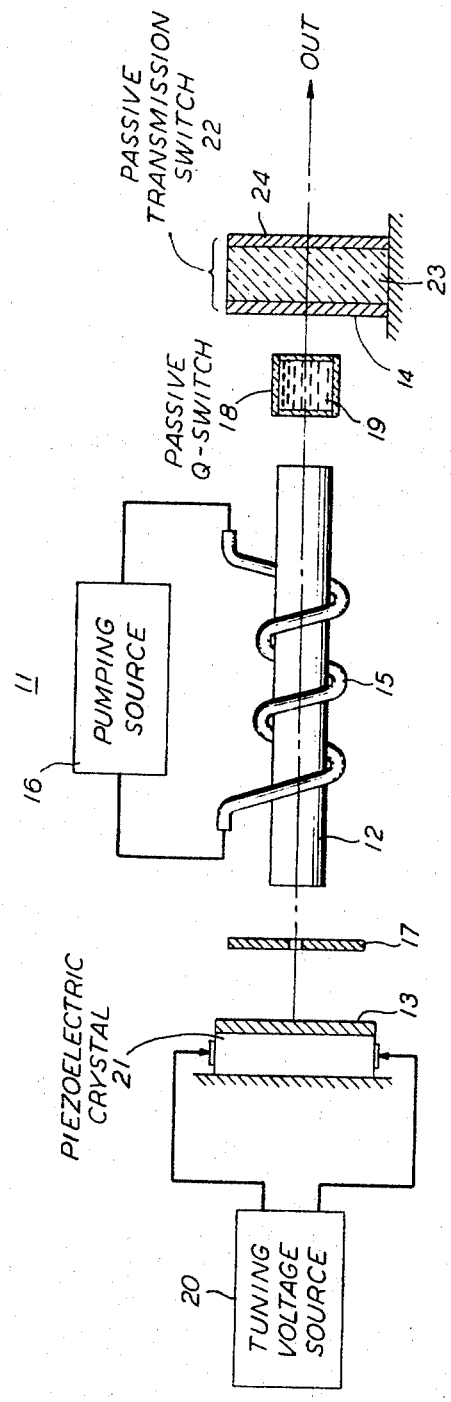

3,500,241
ARRANGEMENT FOR PASSIVE TRANSMISSION PULSING OF A Q-SWITCHED LASER
John E. Bjorkholm, Middletown, N.J., assignor to Bell Telephone Laboratories, Incorporated, Murray Hill, N.J., a corporation of New York
Filed Oct. 23, 1967, Ser. No. 677,270
Int. Cl. H01s 3/16
U.S. Cl. 331—94.5                                                3 Claims

ABSTRACT OF THE DISCLOSURE

There is disclosed a Q-switched laser including passive means, including a saturable absorber, for pulsing the output transmission of the laser after a Q-switched pulse has started. The transmission pulsing means, or transmission switch, disposes the saturable absorber between a pair of closely spaced reflectors, one of which is a reflector of the primary laser resonator. The other is disposed to feed back coherent light in interfering phase relationship at the reflective surface of the first reflector so that the effective transmission of the two reflectors in combination is higher than the transmission of the first reflector. The destructively-interfering feedback does not begin to build up until just before a Q-switched pulse reaches its maximum intensity because of the properties of the saturable absorber in the passive transmission switch.

BACKGROUND OF THE INVENTION

This invention relates to arrangements for transmission pulsing, sometimes called cavity dumping, of a Q-switched laser.

The basic idea of transmission pulsing of a Q-switched laser is taught in A. A. Vuylsteke, Patent No. 3,243,724, issued Mar. 29, 1966. Briefly, it was there recognized that, once a Q-switched pulse in a laser starts to build up rapidly, it no longer requires as high a resonator Q as was required to commence the Q-switched pulse. It was further recognized that much of the potential power of a Q-switched pulse was lost because the high Q of the resonator meant that the available light energy was being coupled out of the resonator at a slow rate. Therefore, it was proposed that the output transmission of a laser resonator should start to increase rapidly just before the Q-switched pulse reaches its maximum intensity. By this technique, a large fraction of the available light energy can be "dumped" out of the laser resonator.

The typical prior art techniques for transmission pulsing employ relatively complicated active means, such as an electro-optic cell employed for modulating the polarization of the light which must then be passed through or reflected from an additional polarization sensitive element to change the output coupling. Moreover, active transmission pulsing schemes present the problem of accurately timing the commencement of the increase of output transmission with respect to the commencement of a Q-switched pulse.

SUMMARY OF THE INVENTION

I have recognized that simple, reliable timing of the transmission pulse, with relatively low loss at the peak of the pulse, may be achieved by employing the properties of a passive transmission switch.

According to my invention, a secondary reflector is disposed outside of a partially transmissive reflector of the primary laser resonator to feed back light in destructively-interfering phase relationship at the reflective surface of the partially transmissive reflector, so that the effective transmission of the two reflectors in combination is higher than the transmission of the first reflector. Appropriate timing of the feedback is accomplished by a passive saturable absorber that inhibits the feedback until a desired intensity of the Q-switched pulse has been achieved in the primary laser resonator. The combination of the partially transmissive reflector of the primary resonator, the secondary partially transmissive reflector and the saturable absorber comprise a passive transmission switch. The absorption characteristics of the saturable absorber are readily selected, for example, by adjusting the initial absorption of the absorber, so that it bleaches a short time before the Q-switched light pulse in the primary resonator reaches its maximum value. Once the saturable absorber in the transmission switch bleaches, the laser resonator changes drastically. The new effective output reflector is the combination of the reflectors in the transmission switch and, when the light intensity has built up in the transmission switch, it presents a high transmission for the light in the primary resonator.

BRIEF DESCRIPTION OF THE DRAWING

A more complete understanding of my invention may be apprehended from the following detailed description, taken together with the drawing, in which the sole figure is a partially pictorial and partially block diagrammatic illustration of a preferred embodiment of the invention.

DESCRIPTION OF ILLUSTRATIVE EMBODIMENTS

In the illustrative embodiment of the drawing, the Q-switched laser 11 includes the active medium 12, illustratively a ruby crystal, the reflectors 13 and 14 of the primary laser resonator, and pumping means including the xenon flash tube 15 and pulsed electrical power source 16. In addition, the laser 11 includes mode selecting means, illustratively the apertured plate 17 in the primary laser resonator, and Q-switching means, illustratively a saturable absorption cell 18. The laser further illustratively includes means for tuning the primary resonator including the tuning voltage source 20 and the piezoelectric crystal 21, upon which the high-reflectivity reflector 13 is mounted.

The passive transmission switch 22 employed in practicing my invention includes as one element thereof the partially transmissive reflector 14, the saturable absorber 23, illustratively a glass as described hereinafter, and another partially transmissive reflector 24, which will hereinafter be designated the secondary reflector. Reflectors 14 and 24 are disposed upon opposed surfaces of the saturable absorber 23.

The ruby crystal 12 is of the type conventionally used in Q-switched ruby lasers and comprises a small amount of chromium ($Cr^{3+}$) (0.05 percent concentration) in an aluminum oxide single crystal host. The dimensions of crystal 12 are illustratively 4 inch by ⅜ inch diameter. Nevertheless, it should be understood that a variety of other laser active media, including all of those which can be Q-switched, can be employed in my invention.

The Q-switching cell 18 illustratively includes a liquid solution of cryptocyanine that is initially 50 percent transmissive and is contained within a transparent-walled container. Although other saturable absorbers could be used in Q-switching means 18, a liquid solution as described provides the capability of readily changing the initial transmission by changing the concentration of the solution. Active electro-optic Q-switching means, as well as a rotating reflector, could also be employed in place of the passive Q-switch 18. Timing of the voltage pulse applied to an active Q-switch does not present a problem in my invention, since the relative timing of the transmission switch 22 is solely determined by the properties of the transmission switch.

Although the mode selecting means 17 is illustratively shown as a plate with a 2 millimeter diameter aperture in the light transmission path of the primary laser resonator, it should be understood that the desired mode can also be selected by a variety of other means, including, for example, the use of a signal beam with proper mode structure which illustratively could be injected at the start of the Q-switched pulse. Moreover, while mode control is desirable in a Q-switched laser, it is not necessary and can be dispensed with entirely.

The pulsed pumping power from flashlamp 15 is illustratively 4500 joules.

The preferred properties of the passive transmission switch 22 are as follows. The partially transmissive reflector 14 illustratively has a reflectivity of 80 percent in the absence of feedback from reflector 24. The reflectivity of reflector 24 in the absence of interaction with reflector 14 is illustratively about 80 percent. It should, nonetheless, be carefully noted that the combination of reflectors 14 and 24, after saturable absorber 23 has bleached, presents a high transmission to the radiation in the primary resonator and, in combination, would have an effective transmission of approximately 100 percent. The glass saturable absorber 23 is illustratively one of the Jena-Schott Glass Filters RG695 or RG715, as sold by the Jenaer Glaswerk Schott & Gen., Mainz, Germany. Although such catalog numbers are occasionally changed, it should be understood that a number of bleachable, or saturable absorbing, glasses are commercially available. Illustratively, with mode control means as shown, the saturable absorber 23 should have an initial transmission of about 20 percent. If no mode control means are used, the initial transmissions of both Q-switch 18 and saturable absorber 23 may be substantially greater than those above described. The reasons for this relationship are complex and derive from practical conditions desired for the onset of Q-switched oscillations. In all events, the Q-switching cell 18, when passive, has an initial transmissivity adequate to commence a Q-switched pulse and the saturable absorber 23 in the transmission switch 22 has an initial transmissivity adapted to permit absorber 23 to bleach just before the Q-switched pulse reaches its maximum value.

It should be noted that a liquid saturable absorber could be substituted for the glass saturable absorber 23, provided adequate care is taken to insure parallelness of all surfaces in the cell and of reflectors 14 and 24. A body of saturable absorbing glass is readily polished to have such parallel surfaces.

In operation, when the flashlamp 15 is fired, the laser radiation starts to build up in the primary resonator from noise. When the light intensity becomes great enough, the passive Q-switching cell 18 bleaches; and a giant pulse begins to form in the primary resonator. The light energy coupled out of the primary resonator into transmission switch 22 rapidly increases; and the concentration of absorbing centers in saturable absorber 23 is such that it bleaches a short time before the light intensity in the primary resonator reaches its maximum value. Once the saturable absorber 23 bleaches, the resonator is drastically changed. The new effective output reflector is the combination of reflectors 14 and 24; and it presents a high transmission for light in the primary resonator. Thus, the bleaching of saturable absorber 23 automatically switches the output coupling from low values to high values. Since the timing is inherent in the properties of the passive materials, considerable simplification in achieving pulsed transmission mode operation is obtained.

In more detail, the properties pertinent to the relative timing of the Q-switching and transmission pulsing are the following. Even if saturable absorber 23 were to switch instantaneously, the effective output coupling would take a finite time to build up. This time is of the order of $$\frac{2 \times l_2}{c} \times \frac{1}{\gamma}$$

where $l_2$ is the dimension of the saturable absorber 23 along the light beam path (or more generally, the pathlength in the secondary resonator), $c$ is the velocity of light in compatible units and $\gamma$ is the round-trip loss for the secondary resonator formed by reflectors 14 and 24. Thus, the switching delay is proportional to $l_2$; and it increases as the reflectivities of reflectors 14 and 24 increase. To reduce the delay time, we would like to make $l_2$ as short as possible. This is most easily achieved with the solid state saturable absorber 23 with dielectric mirrors 14 and 24 deposited on its surfaces. A typical value of $l_2$ is about 3 millimeters and yields a round-trip time of the light in the transmission switch 22 of about $0.5 \times 10^{-10}$ seconds. The delay time would be of the order of 0.5 nanoseconds. This delay time and any bleaching delay are properly adapted with respect to all the gain-determining parameters of the Q-switched laser to insure the effectiveness of the destructively-interfering feedback at the maximum intensity of the Q-switched pulse.

Once bleaching of saturable absorber 23 occurs, the power coupled out of the laser by the passive transmission switch 22 will increase only if the radiation in the primary resonator is resonant or nearly resonant in the secondary resonator formed by reflectors 14 and 24. In the illustrative embodiment of the drawing, this condition is satisfied by tuning the primary resonator by moving mirror 13 upon its piezoelectric mount 21 in response to a variable tuning voltage from source 20. Since the mode spacing of the primary resonator is much smaller than that of the secondary resonator, the tuning is easily accomplished, so that the frequency band of at least one of the axial modes of the primary resonator overlaps the frequency band of an axial mode of the secondary resonator.

The output pulse width will be of the order of $$\frac{2 \times l_1}{c}$$

where $l_1$ is the length of the primary resonator. This pulse width is about 3 nanoseconds for $l_1 = 50$ centimeters. It will include a major portion of the available light energy in the primary resonator. Because this energy is coupled out of the laser in a short time, the output power is higher than if transmission switching were not utilized.

What is claimed is:
1. A laser of thre type including an optical resonator having primary reflectors, means for switching said resonator from a first Q condition to a higher Q condition to initiate a pulse of coherent radiation, and means for switching the transmissivity of one of said reflectors from a first transmissivity to a higher transmissivity to couple said pulse out of the laser, said laser being characterized in that said transmissivity switching means comprises a partially transmissive secondary reflector disposed outside of said one primary reflector and adapted to provide destructively-interfering feedback of said radiation through said one primary reflector, and means for inhibiting said destructively-interfering feedback until a desired intensity of said radiation is achieved between said one primary reflector and said secondary reflector.

2. A laser according to claim 1 in which the means for inhibiting the destructively-interfering feedback comprises a saturable absorber adapted to bleach just before the pulse of coherent radiation has reached its maximum intensity.

3. A laser according to claim 1 in which the means for switching the laser from a first Q condition to a higher Q condition comprises a passive Q switch including a saturable absorber having an initial transmissivity adequate to commence a Q-switched pulse, the feedback inhibiting means including a saturable absorber providing an optical pathlength and an initial transmissivity selected to provide the desired timing of the transmissivity switching.

(References on following page)

References Cited

UNITED STATES PATENTS

| | | | |
|---|---|---|---|
| 3,423,695 | 1/1969 | Boyden | 331—94.5 |
| 3,437,953 | 4/1969 | Buchman | 331—94.5 |
| 3,243,724 | 3/1966 | Vuylsteke. | |

OTHER REFERENCES

Cross et al., Generation of Giant Pulses from a Neodymium Laser with an Organic-Dye Saturable Filter; J. Applied Physics, vol. 38, No. 5 (April 1967) pp. 2290–2294.

JEWELL H. PEDERSEN, Primary Examiner

WILLIAM L. SIKES, Assistant Examiner

U.S. Cl. X.R.

350—160